United States Patent
Longman et al.

(10) Patent No.: US 11,294,029 B2
(45) Date of Patent: Apr. 5, 2022

(54) RADAR SYSTEM AND METHOD FOR UPDATING WAVEFORM PARAMETERS

(71) Applicant: GM GLOBAL TECHNOLOGY OPERATIONS LLC, Detroit, MI (US)

(72) Inventors: Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 449 days.

(21) Appl. No.: 16/385,549

(22) Filed: Apr. 16, 2019

(65) Prior Publication Data
US 2020/0333433 A1 Oct. 22, 2020

(51) Int. Cl.
*G01S 7/35* (2006.01)
*G01S 13/931* (2020.01)

(52) U.S. Cl.
CPC .............. *G01S 7/35* (2013.01); *G01S 13/931* (2013.01); *G01S 2013/932* (2020.01)

(58) Field of Classification Search
CPC . G01S 7/28; G01S 7/282; G01S 7/285; G01S 13/34; G01S 13/343; G01S 13/345; G01S 13/931; G01S 2013/932
See application file for complete search history.

(56) References Cited

U.S. PATENT DOCUMENTS

| | | | | |
|---|---|---|---|---|
| 4,642,641 A * | 2/1987 | Campbell | ............... | G01S 13/12 342/137 |
| 5,652,589 A * | 7/1997 | Ono | ...................... | G01S 13/345 342/70 |
| 5,694,130 A * | 12/1997 | Suzuki | .................. | G01S 13/931 342/70 |
| 5,940,024 A * | 8/1999 | Takagi | .................. | G01S 13/345 342/70 |
| 5,977,905 A * | 11/1999 | Le Chevalier | .......... | G01S 13/53 342/110 |
| 6,043,773 A * | 3/2000 | Watanabe | ............. | G01S 13/931 342/158 |
| 6,067,038 A * | 5/2000 | Uehara | .................. | G01S 13/584 342/70 |
| 6,384,768 B1 * | 5/2002 | Kai | ........................ | G01S 13/345 342/104 |
| 6,522,287 B1 * | 2/2003 | Stopczynski | ........... | G01S 13/42 342/70 |
| 6,798,373 B2 * | 9/2004 | Kishida | ................. | G01S 13/931 342/70 |
| 7,123,184 B2 * | 10/2006 | Shono | ..................... | G01S 7/354 342/89 |
| 7,400,290 B2 * | 7/2008 | Woodington | ......... | G01S 13/528 342/84 |

(Continued)

*Primary Examiner* — Peter M Bythrow
(74) *Attorney, Agent, or Firm* — Cantor Colburn LLP (57) ABSTRACT

A radar system for use in a vehicle may include a radar transmitter structured to transmit a radar signal having a waveform; and a controller operably connected to the radar transmitter and configured to control the waveform. The waveform may be characterized by a waveform parameter. The controller may be configured to set a value of the waveform parameter based on a present operational state of the vehicle, thereby generating an updated waveform. The radar transmitter may be structured to transmit an updated radar signal having the updated waveform.

15 Claims, 6 Drawing Sheets

(56) References Cited

U.S. PATENT DOCUMENTS

| | | | | |
|---|---|---|---|---|
| 7,663,537 B2* | 2/2010 | Suzuki | G01S 13/931 | 342/133 |
| 7,786,927 B2* | 8/2010 | Kondoh | G01S 13/343 | 342/109 |
| 7,804,444 B2* | 9/2010 | Yamashina | G01S 13/52 | 342/70 |
| 8,169,359 B2* | 5/2012 | Aoyagi | G01S 13/18 | 342/109 |
| 8,471,760 B2* | 6/2013 | Szajnowski | G01S 7/0232 | 342/70 |
| 9,116,242 B2* | 8/2015 | Lee | G01S 13/931 | |
| 9,244,164 B2* | 1/2016 | Luebbert | G01S 13/343 | |
| 9,547,078 B2* | 1/2017 | Kuehnle | G01S 13/931 | |
| 9,840,256 B1* | 12/2017 | Valois | G01S 17/931 | |
| 10,012,726 B2* | 7/2018 | Schoor | G01S 13/345 | |
| 10,473,755 B1* | 11/2019 | Doerry | G01S 13/931 | |
| 10,509,121 B2* | 12/2019 | Smith | G01S 13/931 | |
| 10,775,478 B2* | 9/2020 | Davis | G01S 7/032 | |
| 10,848,718 B2* | 11/2020 | Ozbilgin | G01S 17/86 | |
| 11,016,181 B2* | 5/2021 | Schwarz | G01S 7/4817 | |
| 11,099,264 B2* | 8/2021 | Bhatia | G01S 13/12 | |
| 2002/0130810 A1* | 9/2002 | Gottwald | G01S 13/225 | 342/159 |
| 2004/0164892 A1* | 8/2004 | Shinoda | H01Q 1/3233 | 342/107 |
| 2006/0012511 A1* | 1/2006 | Dooi | G01S 13/87 | 342/70 |
| 2007/0152870 A1* | 7/2007 | Woodington | G01S 13/528 | 342/70 |
| 2010/0277359 A1* | 11/2010 | Ando | G01S 7/4008 | 342/70 |
| 2016/0003938 A1* | 1/2016 | Gazit | G01S 13/931 | 342/81 |
| 2017/0254880 A1* | 9/2017 | Smith | G01S 13/86 | |
| 2019/0086512 A1* | 3/2019 | Bilik | G01S 13/878 | |
| 2019/0281260 A1* | 9/2019 | Ozbilgin | G01S 13/42 | |
| 2020/0057137 A1* | 2/2020 | Solodky | G01S 7/40 | |
| 2020/0217952 A1* | 7/2020 | Rider | G06K 9/2018 | |
| 2020/0241125 A1* | 7/2020 | Sivadas | G01S 7/354 | |
| 2020/0309933 A1* | 10/2020 | Ray | G01S 13/86 | |
| 2020/0309939 A1* | 10/2020 | Subburaj | G01S 7/352 | |

\* cited by examiner

RADAR SYSTEM AND METHOD FOR UPDATING WAVEFORM PARAMETERS

INTRODUCTION

The subject disclosure relates to a radar system and method for updating waveform parameters.

In radar systems, there is a defined relationship between maximal range, maximal Doppler shift, and range resolution. As maximal range and maximal Doppler shift increase, low range resolution is induced. Conversely, as maximal range and maximal Doppler shift decrease, high range resolution is induced. In a traditional radar system, the waveform parameters of the radar signal are typically selected so as to result in a radar signal having a large enough maximal range and maximal Doppler shift for highest velocity of the host vehicle. However, this results in the radar system being limited to a low range resolution, even when the host vehicle is being operated at speeds that do not require large maximal range and maximal Doppler shift. This may be undesirable in certain operating conditions where a high range resolution may be more important than a large maximal range or large maximal Doppler shift.

Accordingly, it may be desirable to provide a radar system and method that can update waveform parameters based on host vehicle velocity in order to achieve different performance characteristics appropriate for the operating condition of the host vehicle.

SUMMARY

In one exemplary embodiment, a radar system may include a radar transmitter structured to transmit a radar signal having a waveform, and a controller operably connected to the radar transmitter and configured to control the waveform. The waveform may be characterized by a waveform parameter. The controller may configured to set a value of the waveform parameter based on a present operational state of the vehicle, thereby generating an updated waveform. The radar transmitter may be structured to transmit an updated radar signal having the updated waveform.

In another exemplary embodiment of the radar system, the waveform parameter may be one of a pulse repetition interval, a chirp slope, a sampling rate, and a number of samples.

In another exemplary embodiment of the radar system, the waveform may be characterized by a plurality of waveform parameters. The controller may be configured to set values of the plurality of waveform parameters based on the present operational state of the vehicle. The plurality of waveform parameters may include a pulse repetition interval, a chirp slope, a sampling rate, and a number of samples.

In another exemplary embodiment of the radar system, the controller may be configured to store a first predetermined value, a second predetermined value, and a threshold condition. The controller may be configured to set the waveform parameter to the first predetermined value in response to the threshold condition being satisfied. The controller may be configured to set the waveform parameter to the second predetermined value in response to the threshold condition not being satisfied.

In another exemplary embodiment of the radar system, the controller may be configured to store a plurality of predetermined values and a plurality of operational state conditions. Each predetermined value of the plurality of predetermined values may correspond to one operational state condition of the plurality of operational state conditions. The controller may be configured to determine which operational state condition of the plurality of operational state conditions includes the present operational state of the vehicle. The controller may be configured to set the waveform parameter to the predetermined value corresponding to the operational state condition that includes the present operational state of the vehicle.

In another exemplary embodiment of the radar system, the present operational state of the vehicle may include a velocity of the vehicle.

In another exemplary embodiment of the radar system, the present operational state of the vehicle may include navigational data.

In another exemplary embodiment of the radar system, the controller may be configured to determine required performance characteristics of the radar signal based on the present operational state of the vehicle. The controller may be configured to set the value of the waveform parameter such that the resulting waveform satisfies the required performance characteristics.

In another exemplary embodiment of the radar system, the radar system may include an antenna. The radar transmitter, the controller, and the antenna may be provided in a vehicle comprising an automated driving system operably connected to the radar system. The automated driving system may be structured to autonomously control the vehicle based on a reflected radar signal detected by the antenna.

In one exemplary embodiment, a method for updating a waveform of a radar signal may be used with a radar system in a vehicle. The radar system may include a radar transmitter structured to transmit a radar signal having a waveform characterized by a waveform parameter and a controller operably connected to the radar transmitter and configured to control the waveform. The method may include determining a present operational state of the vehicle. The method may further include setting a value of the waveform parameter based on the present operational state, thereby generating an updated waveform. The method may further include transmitting an updated radar signal characterized by the updated waveform.

In another exemplary embodiment of the method, the waveform parameter may be one of a pulse repetition interval, a chirp slope, a sampling rate, and a number of samples.

In another exemplary embodiment of the method, the waveform may be characterized by a plurality of waveform parameters. The setting the value of the waveform parameter may include setting values of the plurality of waveform parameters based on the present operational state, The plurality of waveform parameters may include a pulse repetition interval, a chirp slope, a sampling rate, and a number of samples.

In another exemplary embodiment of the method, the method may include storing a first predetermined value, a second predetermined value, and a threshold condition. The setting the value of the waveform parameter may include setting the waveform parameter to the first predetermined value in response to the threshold condition being satisfied and setting the waveform parameter to the second predetermined value in response to the threshold condition not being satisfied.

In another exemplary embodiment of the method, the method may include storing a plurality of predetermined values and a plurality of operational state conditions. Each predetermined value of the plurality of predetermined values may correspond to one operational state condition of the plurality of operational state conditions. The setting the value of the waveform parameter may further include determining which operational state condition of the plurality of operational state conditions includes the present operational state of the vehicle and setting the waveform parameter to the predetermined value corresponding to the operational state condition that includes the present operational state of the vehicle.

In another exemplary embodiment of the method, the present operational state of the vehicle comprises a velocity of the vehicle.

In another exemplary embodiment of the method, the present operational state of the vehicle comprises navigational data.

In another exemplary embodiment of the method, the method may further include determining required performance characteristics of the radar signal based on the present operational state of the vehicle. The setting the value of the waveform parameter may include setting the value of the waveform parameter such that the resulting waveform satisfies the required performance characteristics.

In another exemplary embodiment of the method, the radar system may further comprise an antenna. The method may further include providing the radar transmitter, the controller, and the antenna in the vehicle. The vehicle may include an automated driving system operably connected to the radar system. The automated driving system may be structured to autonomously control the vehicle based on a reflected radar signal detected by the antenna.

In one exemplary embodiment, a vehicle may include an automated driving system structured to autonomously control the vehicle and a radar system operably connected to the automated driving system. The radar system may include a radar transmitter structured to transmit a radar signal having a waveform, a controller operably connected to the radar transmitter and configured to control the waveform, and an antenna structured to detect a reflected radar signal. The waveform may be characterized by a waveform parameter. The controller may be configured to set a value of the waveform parameter based on a present operational state of the vehicle, thereby generating an updated waveform. The radar transmitter may be structured to transmit an updated radar signal having the updated waveform. The automated driving system may be structured to autonomously control the vehicle based on the reflected radar signal detected by the antenna.

In another exemplary embodiment of the vehicle, the waveform may be characterized by a plurality of waveform parameters. The controller may be configured to vary values of the plurality of waveform parameters based on the present operational state of the vehicle. The plurality of waveform parameters may include a pulse repetition interval, a chirp slope, a sampling rate, and a number of samples.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a controller (shared, dedicated, or group) and memory that executes one or more software or firmware programs, a combinational logic circuit, and/or other suitable components that provide the described functionality.

Figure 1:
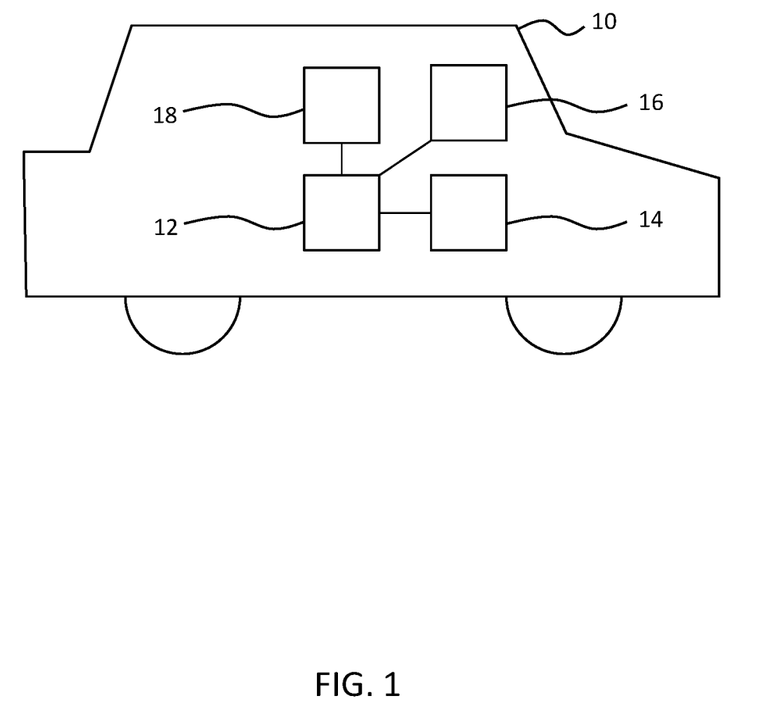
FIG. 1 is a schematic diagram of a vehicle according to an exemplary embodiment.

FIG. 1 shows an exemplary embodiment of a vehicle 10 including an automated driving system 12 and a radar system 14. Automated driving system 12 may be operably connected to radar system 14, and may also include or be operably connected to additional sensors 16 configured to detect a driving environment. Sensors 16 may include a camera, an additional radar system, a LIDAR system, or any combination of these systems. In response to driving environment information detected by radar system 14 and/or sensors 16, automated driving system 12 may calculate a vehicle path plan for vehicle 10.

Automated driving system 12 may further include or be operably connected to vehicle controllers 18 configured to control speed, acceleration, braking, steering, or other operations necessary for operating vehicle 10. Automated driving system 12 may control vehicle controllers 18 to operate vehicle 10 according to the calculated vehicle path plan. It will be understood that vehicle 10 may be a fully autonomous vehicle in which automated driving system 12 controls all aspects of the vehicle operation, or vehicle 10 may be a vehicle in which the driver retains some autonomous control and automated driving system 12 is part of a driver assist system configured to assist with a subset of vehicle operations such as parking or highway cruising.

Figure 2:
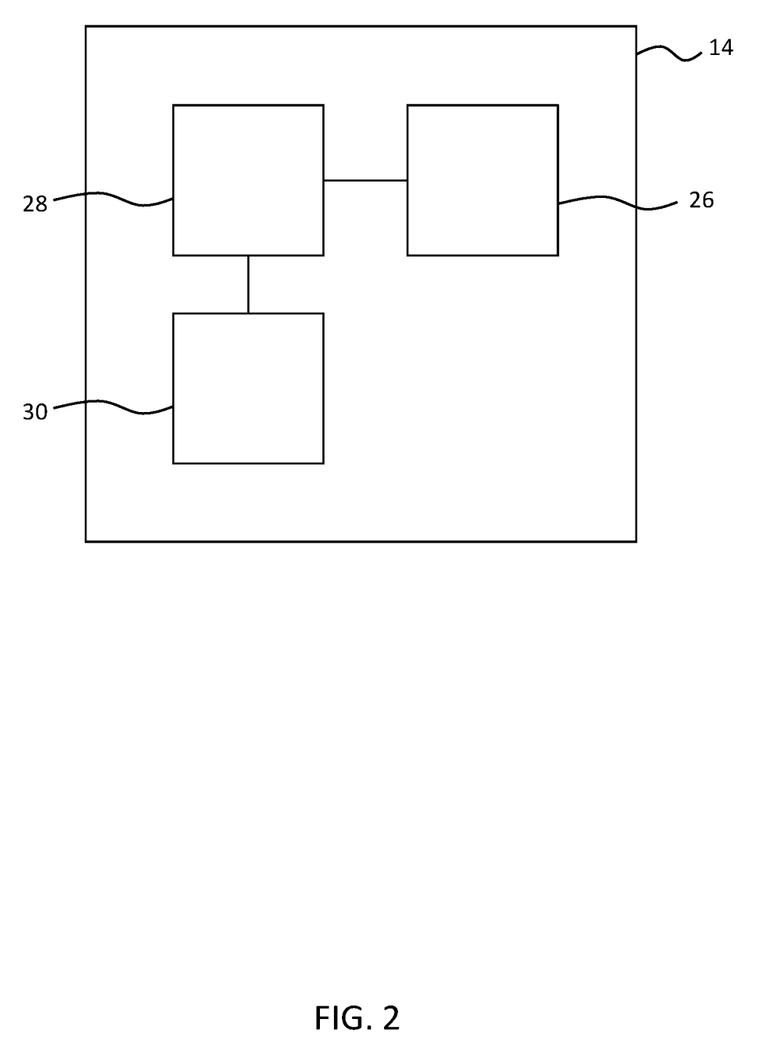
FIG. 2 is a schematic diagram of a radar system according to an exemplary embodiment.

FIG. 2 shows an exemplary embodiment of radar system 14. Radar system 14 may include transmitter 30 structured to transmit a radar signal. Radar system 14 may further include an antenna 26 structured to receive reflected radar signals from targets. Radar system 14 may further include a controller 28 operably connected to antenna 26 and transmitter 30 and configured to operate on signals received by antenna 26. Controller 28 may further be configured to control a waveform of a radar signal output by transmitter 30.

In an exemplary embodiment, the radar signal output by transmitter 30 may be a linear frequency modulated continuous wave (LFM-CW) signal. An LFM-CW signal may be characterized by one or more waveform parameters such as pulse repetition interval (PRI), chirp slope, sampling rate, and number of samples. The PRI corresponds to the interval between pulses, with closer pulses (i.e., small PRI) being better at tracking fast changes and resulting in a higher Unambiguous Doppler. However, a small PRI will also result in a lower maximal range and low range resolution.

The chirp slope is a measure of how quickly the radar signal sweeps across a range of frequencies. The waveform of the radar signal may also be characterized by one or more performance characteristics, such as maximal range, maximal Doppler shift, and range resolution. It will be understood there is a fixed relationship between maximal range, maximal Doppler shift, and range solution in a radar system. For example, a radar signal that has a large maximal range and large maximal Doppler shift will have a correspondingly low range resolution, and a radar signal that has a high range resolution will have a correspondingly small maximal range and small maximal Doppler shift.

The necessary performance characteristics may be determined by the operation state of the vehicle. For example, in high speed applications such as traveling at highway speeds, a large maximal range and maximal Doppler shift may be necessary for the radar system to be able to detect all of vehicles and objects that could possibly affect operation of the vehicle. The large maximal range and maximal Doppler shift would result in a corresponding low range resolution, but this is not as important at highway speeds where vehicles are spaced farther apart.

In contrast, in a low speed application such as parallel parking or navigating a parking lot, a high range resolution may be necessary in order to precisely determine the location of nearby objects and vehicles in order to avoid a collision while navigating so close to other objects. The high range resolution would result in a corresponding low maximal range and low maximal Doppler shift, but this is not as important during low speed maneuver where far off objects and vehicles will have no effect on the operation of the vehicle.

The following equations may be used to define the relationship between the waveform parameters and the waveform performance characteristics. For example, the PRI may be given by the equation:

$$PRI = \frac{1}{2 Doppler_{max}}; \qquad (1)$$

where $Doppler_{max}$ is the maximal Doppler shift. The chirp slope may be given by the equation:

$$Slope = \frac{f_s}{Range_{max}} \cdot \frac{c}{2}; \qquad (2)$$

where Slope is the chirp slope, $f_s$ is the ADC sampling frequency, $Range_{max}$ is the maximal range, and c is the speed of light. A bandwidth of the radar signal may be given by the equation:

$$B = \frac{N_{samples}}{f_s} \cdot Slope; \qquad (3)$$

where B is the bandwidth, and $N_{samples}$ is the number of samples. The range resolution may be given by the equation:

$$\Delta R = \frac{c}{2B} = \frac{1}{Slope \cdot PRI} \cdot \frac{c}{2}; \qquad (4)$$

where $\Delta R$ is the range resolution. Once performance characteristics such the maximal required range, maximal required Doppler shift, and range resolution are identified for a particular operation state of a vehicle, Equations (1)-(4) can be used to calculate the parameters of the waveform necessary to achieve the desired performance characteristics.

Figure 3:
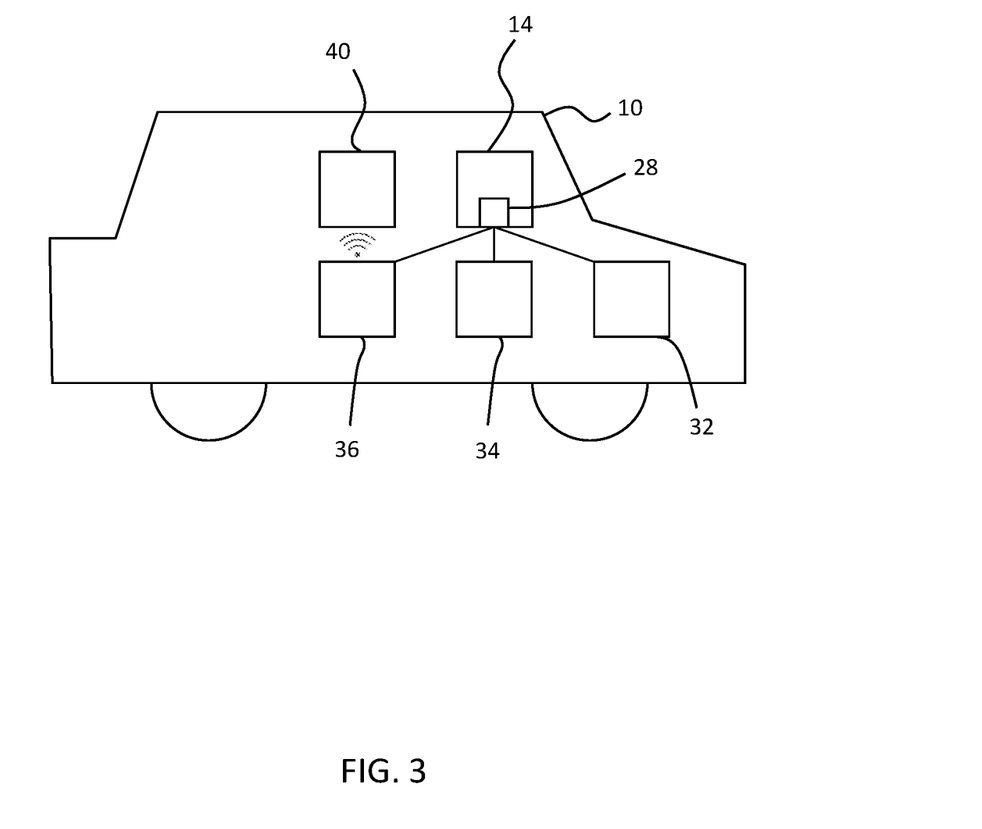
FIG. 3 is a schematic diagram of a vehicle according to an exemplary embodiment.

FIG. 3 shows an exemplary embodiment of vehicle 10 in which controller 28 of radar system 14 is configured to obtain a present operational state of vehicle 10. In an exemplary embodiment, an operational state of vehicle 10 may include a velocity of vehicle 10. For example, controller 28 of radar system 14 may be operably connected to a sensor that measures a velocity of vehicle 10, such as speedometer 32. Alternatively, controller 28 may be operably connected to a device such an as onboard navigation device 34 to obtain vehicle velocity from GPS data. Alternatively, if a personal device 40, such as a smart phone or tablet, is being used for navigation and GPS data, controller 28 may wirelessly communicate with personal device 40 via communication node 36. In addition to vehicle velocity, the operational state of vehicle 10 may include navigation information obtained from onboard navigation device 34 or personal device 40. Navigation information may include information about whether vehicle 10 is on a highway, on local roads, nearing a destination, or in a parking lot. The navigation information may also include route information, so controller 28 may be able to preemptively determine an upcoming change in the operational state of vehicle 10.

Figure 4:
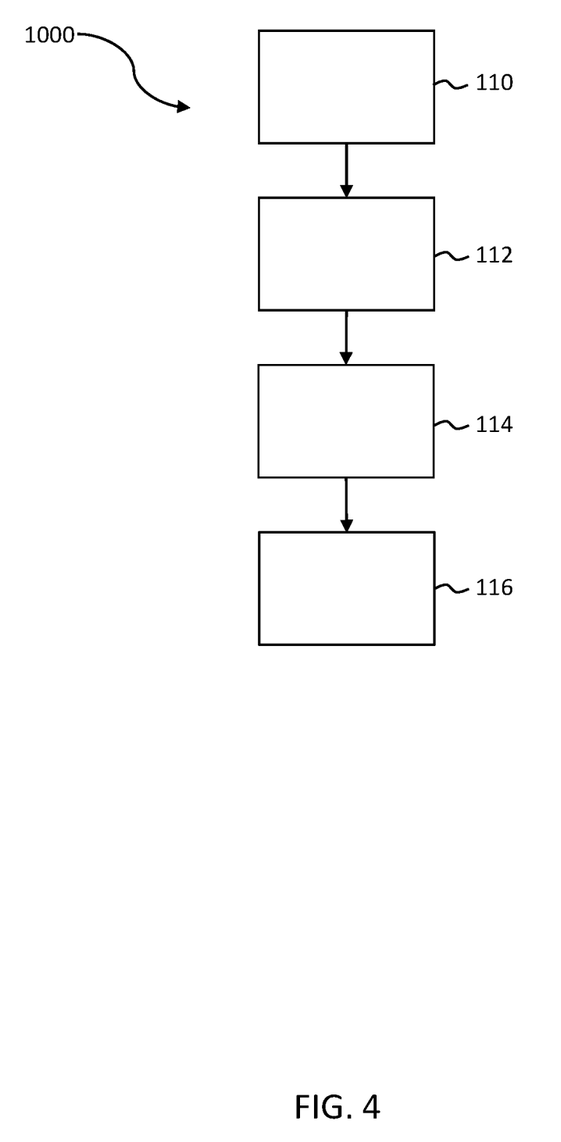
FIG. 4 is a flowchart illustrating an exemplary embodiment of a method for updating a waveform of a radar signal.

FIG. 4 illustrates an exemplary embodiment of a method 1000 for updating a waveform of a radar signal. For example, in block 110, a radar system 14 including a controller 28 and transmitter 30 may be provided (see FIG. 2). In block 112, controller 28 may obtain a present operational state of vehicle 10 as described herein (see FIG. 3). In block 114, controller 28 may set a value of one or more of the waveform parameters based on the present operational state of vehicle 10. For example, if the present operational state of vehicle 10 is highway driving (as determined by vehicle velocity and/or navigation information), controller 28 may set a value of one or more of the waveform parameters to generate an updated waveform which has high maximal velocity and high maximal Doppler shift. Conversely, if the present operational state of vehicle 10 is navigating a parking lot (as determined by vehicle velocity and/or navigation information) controller 28 may set a value of one or more of the waveform parameters to generate an updated waveform having high range resolution. In block 116, transmitter 30 may transmit an updated radar signal based on the updated waveform.

Figure 5:
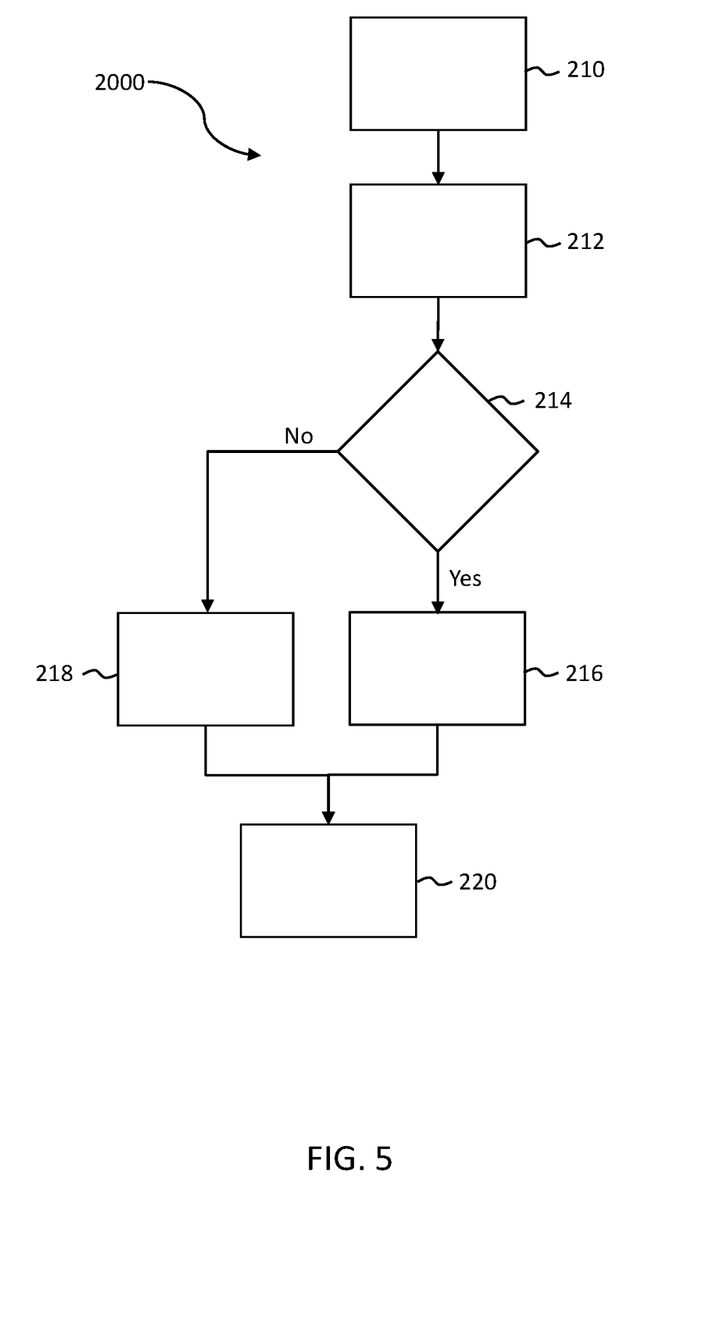
FIG. 5 is a flowchart illustrating an exemplary embodiment of a method for updating a waveform of a radar signal.

FIG. 5 illustrates an exemplary embodiment of a method 2000 for updating a waveform of a radar signal. In block 210, controller 28 (see FIGS. 2 and 3) may store a one or more first predetermined values corresponding to one or more waveform parameters, one or more second predetermined values corresponding to a waveform parameter, and a threshold condition. The threshold condition may be a threshold related to the operational state of vehicle 10. For example, threshold condition may be a velocity threshold such greater than or equal to 35 miles per hour (mph). In block 212, controller 28 may obtain a present operational state of vehicle 10 as described herein.

In block 214, controller 28 determines whether the operational state of vehicle 10 satisfies the threshold condition. If the operational state of vehicle 10 satisfies the threshold condition ("yes" in block 214), then the method proceeds to block 216. For example, if vehicle 10 has a velocity of 50 mph, this would satisfy a threshold condition of greater than or equal to 35 mph. In an exemplary embodiment, satisfying the threshold condition may indicate an operational state in which performance characteristics of large maximal range and large maximal Doppler shift are desirable. Accordingly, in block 216, controller 28 may set the one or more waveform parameters to the one or more first predetermined values to generate an updated waveform having a large maximal range and large maximal Doppler shift. Then, the method proceeds to block 220 where transmitter 30 transmits an updated radar signal based on the updated waveform.

Returning to block 214, if the operational state of vehicle 10 does not satisfy the threshold condition ("no" in block 214), then the method proceeds to block 218. For example, if vehicle 10 has a velocity of 15 mph, this would not satisfy the threshold condition of greater than or equal to 35 mph. In an exemplary embodiment, not satisfying the threshold condition may indicate an operational state in which performance characteristics of high range resolution are desirable. Accordingly, in block 218, controller 28 may set the one or more waveform parameters to the one or more second predetermined values to generate an updated waveform having a high range resolution. Then, the method proceeds to block 220 where transmitter 30 transmits an updated radar signal based on the updated waveform.

Figure 6:
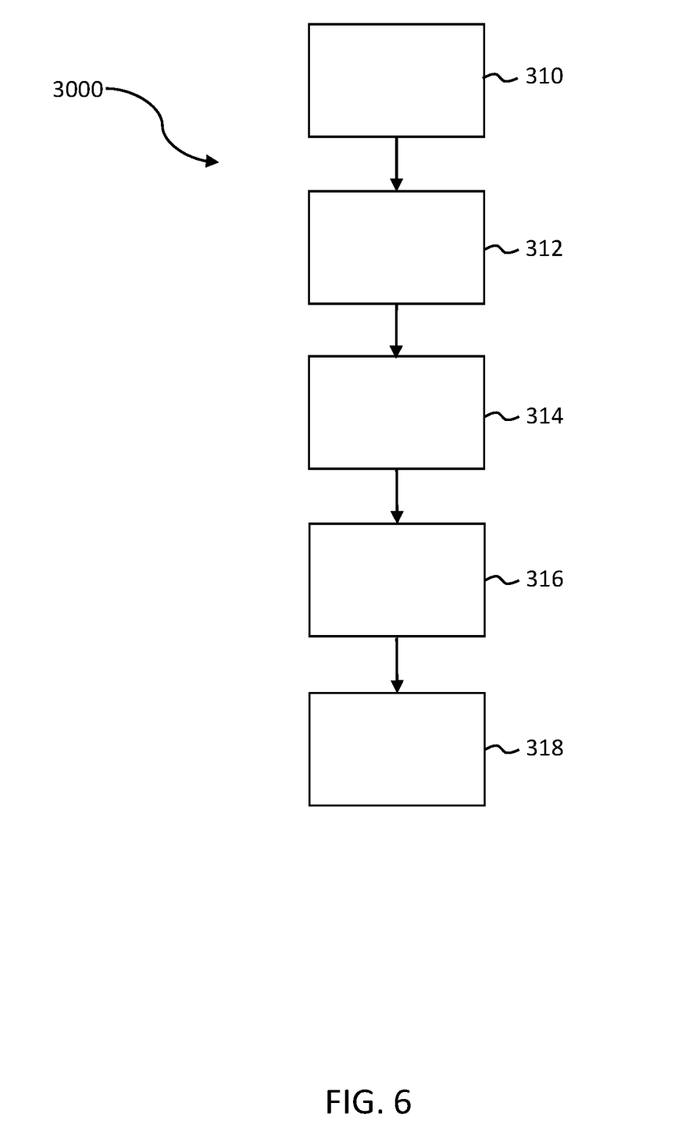
FIG. 6 is a flowchart illustrating an exemplary embodiment of a method for updating a waveform of a radar signal.

FIG. 6 illustrates an exemplary embodiment of a method 3000 for updating a waveform of a radar signal. In block 310, controller 28 (see FIGS. 2 and 3) may store a plurality of predetermined parameter values and a plurality of operational state conditions. For example, the plurality of operational state conditions may include a first state condition of velocity being less than 20 mph, a second state condition of velocity being in a range of 20 mph to 45 mph, and a third state condition of velocity being greater than 45 mph. Each of the state conditions may have an associated set of waveform performance characteristics. For example, the first state condition may be associated with waveform performance characteristics of high range resolution, the third state condition may be associated with waveform performance characteristics of large maximal range and large maximal Doppler shift, and the third state condition may be associated with waveform performance characteristics of intermediate maximal range, intermediate maximal Doppler shift, and intermediate range resolution. While three state conditions are described herein, it will be understood that a larger number of state conditions may also be possible.

In an exemplary embodiment, each of the plurality of predetermined parameter values may be correspond to one of the operational state conditions. For example, a first predetermined parameter value may correspond to the first state condition, a second predetermined parameter value may correspond to the second state condition, and a third predetermined parameter value may correspond to the third state condition. It will also be understood that each of the predetermined parameter values may instead correspond to a set of predetermined parameter values. For example, instead of a first predetermined parameter value, a first set of predetermined parameter values may be associated with the first operation state.

Each of the predetermined parameter values or sets of parameter values may be selected so as to generate a waveform having the performance characteristics associated with the corresponding operation state. For example, the first predetermined parameter value may generate a waveform having high range resolution, the third predetermined parameter value may generate a waveform having a large maximal range and large maximal Doppler shift, and the second predetermined parameter value may generate a waveform having an intermediate range resolution, intermediate maximal range, and intermediate maximal Doppler shift.

Returning to FIG. 6, in block 312, controller 28 may obtain a present operational state of vehicle 10 as described herein (see FIG. 3). For example, controller 28 may obtain a vehicle speed of vehicle 10. In block 314, controller 28 may determine which of operational state conditions include the present operational state of the vehicle. For example, if the vehicle speed of vehicle 10 is 55 mph, then controller 28 may determine that the third state condition of velocity being greater than 45 mph is indicated. In block 316, controller 28 may set one or more waveform parameters to the predetermined parameter value or set of predetermined parameter value corresponding to the indicated operation state condition to generate an updated waveform. In block 318, transmitter 30 may transmit an updated radar signal based on the updated waveform.

The exemplary embodiments described above result in significant advantages over conventional systems and methods. For example, the exemplary embodiments make it possible to dynamically adjust performance characteristics of a radar signal transmitted by a radar system in a vehicle based on an operational state of the vehicle, during the actual operation of the vehicle. This allows the radar system to provide useful information for a variety of operational states, instead of being limited to a single radar signal.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system for use in a vehicle, the radar system comprising:
 a radar transmitter structured to transmit a radar signal having a waveform; and
 a controller operably connected to the radar transmitter and configured to control the waveform;
 wherein the waveform is characterized by a plurality of waveform parameters;
 wherein the controller is configured to set a values of the plurality of waveform parameters based on a present operational state of the vehicle, thereby generating an updated waveform, and the plurality of waveform parameters comprises a pulse repetition interval, a chirp slope, a sampling rate, and a number of samples; and
 wherein the radar transmitter is structured to transmit an updated radar signal having the updated waveform.

2. The radar system of claim 1, wherein
 the controller is configured to store first predetermined values, second predetermined values, and a threshold condition;
 the controller is configured to set the plurality of waveform parameters to the first predetermined values in response to the threshold condition being satisfied; and the controller is configured to set the waveform parameter to the second predetermined values in response to the threshold condition not being satisfied.

3. The radar system of claim 1, wherein the controller is configured to store a plurality of predetermined values and a plurality of operational state conditions;

wherein each predetermined value of the plurality of predetermined values corresponds to one operational state condition of the plurality of operational state conditions;

wherein the controller is configured to determine which operational state condition of the plurality of operational state conditions includes the present operational state of the vehicle; and the controller is configured to set the waveform parameter to the predetermined value corresponding to the operational state condition that includes the present operational state of the vehicle.

4. The radar system of claim 1, wherein the present operational state of the vehicle comprises a velocity of the vehicle.

5. The radar system of claim 1, wherein the present operational state of the vehicle comprises navigational data.

6. The radar system of claim 1, wherein the controller is configured to determine required performance characteristics of the radar signal based on the present operational state of the vehicle and the controller is configured to set the values of the waveform parameters such that the resulting waveform satisfies the required performance characteristics.

7. The radar system of claim 1, further comprising an antenna, wherein the radar transmitter, the controller, and the antenna are provided in a vehicle comprising an automated driving system operably connected to the radar system, and, wherein the automated driving system is structured to autonomously control the vehicle based on a reflected radar signal detected by the antenna.

8. A method for updating a waveform of a radar signal of a radar system for use in a vehicle, the radar system comprising a radar transmitter to transmit a radar signal having a waveform characterized by a plurality of waveform parameters and a controller operably connected to the radar transmitter and configured to control the waveform, the method comprising:

determining a present operational state of the vehicle;

setting values of the waveform parameters based on the present operational state, thereby generating an updated waveform, wherein the plurality of waveform parameters comprises a pulse repetition interval, a chirp slope, a sampling rate, and a number of samples; and transmitting an updated radar signal characterized by the updated waveform.

9. The method of claim 8, further comprising storing first predetermined values, second predetermined values, and a threshold condition; and the setting the values of the waveform parameters comprises:

setting the waveform parameter to the first predetermined values in response to the threshold condition being satisfied; and setting the waveform parameter to the second predetermined values in response to the threshold condition not being satisfied.

10. The method of claim 8, further comprising storing a plurality of predetermined values and a plurality of operational state conditions wherein each predetermined value of the plurality of predetermined values corresponds to one operational state condition of the plurality of operational state conditions and wherein the setting values of the waveform parameters further comprises:

determining which operational state condition of the plurality of operational state conditions includes the present operational state of the vehicle; and setting the waveform parameters to the predetermined values corresponding to the operational state condition that includes the present operational state of the vehicle.

11. The method of claim 8, wherein the present operational state of the vehicle comprises a velocity of the vehicle.

12. The method of claim 8, wherein the present operational state of the vehicle comprises navigational data.

13. The method of claim 8, further comprising determining required performance characteristics of the radar signal based on the present operational state of the vehicle, wherein the setting the value of the waveform parameter comprises setting the values of the waveform parameters such that the resulting waveform satisfies the required performance characteristics.

14. The method of claim 8, wherein the radar system further comprises an antenna and the method further comprises providing the radar transmitter, the controller, and the antenna in the vehicle, and the vehicle comprises an automated driving system operably connected to the radar system; wherein the automated driving system is structured to autonomously control the vehicle based on a reflected radar signal detected by the antenna.

15. A vehicle comprising:

an automated driving system structured to autonomously control the vehicle;

a radar system operably connected to the automated driving system, the radar system comprising:

a radar transmitter structured to transmit a radar signal having a waveform;

a controller operably connected to the radar transmitter and configured to control the waveform; and an antenna structured to detect a reflected radar signal;

wherein the waveform is characterized by a plurality of waveform parameters;

wherein the controller is configured to set values of the waveform parameters based on a present operational state of the vehicle, thereby generating an updated waveform, and the plurality of waveform parameters comprises pulse repetition interval, chirp slope, sampling rate, and number of samples;

wherein the radar transmitter is structured to transmit an updated radar signal having the updated waveform; and wherein the automated driving system is structured to autonomously control the vehicle based on the reflected radar signal detected by the antenna.

* * * * *